United States Patent
Somashekar et al.

(10) Patent No.: US 12,476,721 B2
(45) Date of Patent: Nov. 18, 2025

(54) GENERATING A TEST CASE ASSOCIATED WITH A TEST RADIO ACCESS NETWORK (RAN) BASED ON KEY PERFORMANCE INDICATORS ASSOCIATED WITH A PRODUCTION RAN OF A WIRELESS TELECOMMUNICATION NETWORK

(71) Applicant: T-Mobile USA, Inc., Bellevue, WA (US)

(72) Inventors: Sharath Somashekar, Overland Park, KS (US); Akriti Kumar, Ashburn, VA (US); Rashmi Kumar, Herndon, VA (US); Diego Estrella Chavez, Tysons, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 357 days.

(21) Appl. No.: 18/325,941

(22) Filed: May 30, 2023

(65) Prior Publication Data

US 2024/0405897 A1 Dec. 5, 2024

(51) Int. Cl.
*H04B 17/14* (2015.01)
*H04L 43/55* (2022.01)

(52) U.S. Cl.
CPC .............. *H04B 17/14* (2015.01); *H04L 43/55* (2022.05)

(58) Field of Classification Search
None
See application file for complete search history.

(56) References Cited

U.S. PATENT DOCUMENTS

| | | |
|---|---|---|
| 7,929,512 B2 | 4/2011 | Malomsoky et al. |
| 8,130,655 B2 | 3/2012 | Foottit et al. |
| 9,615,272 B2 | 4/2017 | Morad et al. |
| 9,655,020 B2 | 5/2017 | Wegmann et al. |
| 9,774,618 B2 | 9/2017 | Sundhar et al. |
| 9,883,378 B2 | 1/2018 | Mildh et al. |
| 9,929,908 B2 | 3/2018 | Ketheesan et al. |
| 9,955,381 B2 | 4/2018 | Koskinen et al. |
| 9,986,432 B2 | 5/2018 | Fransen |

(Continued)

FOREIGN PATENT DOCUMENTS

| | | |
|---|---|---|
| CN | 105393585 A | 3/2016 |
| CN | 105830476 B | 5/2020 |

(Continued)

*Primary Examiner* — Melvin H Pollack
(74) *Attorney, Agent, or Firm* — Perkins Coie LLP

(57) ABSTRACT

The system obtains KPIs of the production RAN of the network and capabilities of multiple UEs interacting with the test RAN. The system creates a test case based on the KPIs and the capabilities of the multiple UEs interacting with the test RAN by: adjusting a type of traffic associated with the test RAN, adjusting traffic characteristics, and adjusting the capabilities of the multiple UEs interacting with the test RAN. The system runs a simulation of the test case interacting with the test RAN to obtain simulation KPIs. The system determines whether the simulation KPIs correspond to the KPIs associated with the production RAN. Upon determining that the simulation KPIs correspond to the KPIs of the production RAN, the system stores the test case in a database. Upon determining that the simulation KPIs do not correspond to the KPIs of the production RAN, the system adjusts the test case.

20 Claims, 5 Drawing Sheets

(56) References Cited

U.S. PATENT DOCUMENTS

| | | |
|---|---|---|
| 10,243,810 B2 | 3/2019 | Kumar et al. |
| 10,299,119 B2 | 5/2019 | Fransen |
| 10,320,621 B1 | 6/2019 | Neisinger |
| 10,498,610 B1 | 12/2019 | Kenig et al. |
| 10,548,002 B2 | 1/2020 | Mildh et al. |
| 10,659,960 B2 | 5/2020 | Fransen |
| 10,841,302 B2 | 11/2020 | Hahn et al. |
| 10,917,819 B2 | 2/2021 | Shetty et al. |
| 10,958,631 B2 | 3/2021 | Fransen |
| 11,146,978 B2 | 10/2021 | Bodiga et al. |
| 11,405,806 B2 * | 8/2022 | Takla .............. H04W 72/23 |
| 11,412,396 B2 * | 8/2022 | Jackson ........... H04B 17/3912 |
| 11,483,226 B2 * | 10/2022 | Menon ................ H04L 69/40 |
| 11,509,542 B2 | 11/2022 | Shirazipour et al. |
| 11,533,247 B2 * | 12/2022 | Saxena ................ H04L 43/04 |
| 11,540,170 B2 * | 12/2022 | Krishnaswamy ......... H04L 1/24 |
| 11,997,512 B2 * | 5/2024 | Li .................... H04B 17/29 |
| 12,069,494 B2 * | 8/2024 | Chenumolu .......... H04W 24/08 |
| 12,086,038 B2 * | 9/2024 | Yeddu ................ G06N 3/082 |
| 12,127,059 B2 * | 10/2024 | Melodia .............. H04B 17/336 |
| 12,216,738 B2 * | 2/2025 | Cmielowski ......... G06F 18/214 |
| 12,273,748 B2 * | 4/2025 | Eleftheriadis ........ H04L 41/142 |
| 12,289,137 B2 * | 4/2025 | Vaez-Ghaemi .................... H04B 10/25759 |
| 12,302,157 B2 * | 5/2025 | Malboubi ............ G06F 18/217 |
| 12,348,401 B2 * | 7/2025 | Ramesh .............. H04W 24/06 |
| 2015/0146616 A1 | 5/2015 | Báder |
| 2018/0220312 A1 * | 8/2018 | Guttenfelder .......... G01S 19/23 |
| 2020/0015154 A1 | 1/2020 | Pateromichelakis et al. |
| 2020/0120489 A1 | 4/2020 | Mildh et al. |
| 2021/0289376 A1 | 9/2021 | Chou et al. |
| 2022/0138081 A1 * | 5/2022 | Varma ................ G06F 11/3684 717/124 |
| 2023/0032390 A1 | 2/2023 | Chandramouli et al. |
| 2023/0037228 A1 | 2/2023 | Panigrahi et al. |
| 2023/0083011 A1 * | 3/2023 | Krishnan ............ H04W 24/00 455/423 |
| 2024/0244125 A1 * | 7/2024 | Muhammad ........ H04L 69/167 |
| 2024/0284298 A1 * | 8/2024 | Yang ................ H04W 76/18 |
| 2024/0340929 A1 * | 10/2024 | Narayanan Thangaraj ................ H04W 76/27 |
| 2024/0349082 A1 * | 10/2024 | Li ..................... H04W 24/02 |
| 2024/0373263 A1 * | 11/2024 | Baker ................ H04W 24/10 |
| 2024/0378506 A1 * | 11/2024 | D'Oro ................ G06N 20/00 |
| 2024/0380532 A1 * | 11/2024 | Gad ................. H04W 72/541 |
| 2024/0406768 A1 * | 12/2024 | Rodriguez Gomez ................ H04W 24/06 |
| 2025/0030607 A1 * | 1/2025 | Báder ................ H04L 43/028 |
| 2025/0063431 A1 * | 2/2025 | Ali ................... H04W 36/362 |

FOREIGN PATENT DOCUMENTS

| | | |
|---|---|---|
| CN | 112534963 A | 3/2021 |
| CN | 110463245 B | 4/2022 |
| CN | 111699658 B | 1/2023 |
| EP | 2706775 A1 | 3/2014 |
| EP | 2566205 B1 | 3/2019 |
| EP | 3087770 B1 | 5/2020 |
| EP | 3375247 B1 | 5/2020 |
| EP | 3735012 A1 | 11/2020 |
| EP | 3138311 B1 | 9/2022 |
| JP | 4612050 B2 | 10/2010 |
| JP | 5801963 B2 | 9/2015 |
| JP | 2016509801 A | 3/2016 |
| JP | 2017520203 A | 7/2017 |
| JP | 6518345 B2 | 4/2019 |
| JP | 6526176 B2 | 5/2019 |
| KR | 20110126123 A | 11/2011 |
| KR | 20190084142 A | 7/2019 |
| KR | 102000508 B1 | 10/2019 |
| KR | 20210060586 A | 5/2021 |
| WO | 2011127775 A1 | 10/2011 |
| WO | 2012022188 A1 | 2/2012 |
| WO | 2012107002 A1 | 8/2012 |
| WO | 2013020584 A1 | 2/2013 |
| WO | 2015026334 A1 | 2/2015 |
| WO | 2015097223 A1 | 7/2015 |
| WO | 2015166099 A1 | 11/2015 |
| WO | 2017081696 A1 | 5/2017 |
| WO | 2017182057 A1 | 10/2017 |
| WO | 2018103855 A1 | 6/2018 |
| WO | 2018166614 A1 | 9/2018 |
| WO | WO-2025079976 A2 * | 4/2025 ............ H04L 45/02 |

* cited by examiner

GENERATING A TEST CASE ASSOCIATED WITH A TEST RADIO ACCESS NETWORK (RAN) BASED ON KEY PERFORMANCE INDICATORS ASSOCIATED WITH A PRODUCTION RAN OF A WIRELESS TELECOMMUNICATION NETWORK

BACKGROUND

In the wireless industry, the RAN is in constant evolution due to implementation of new functionalities. At the same time, user equipment (UE) hardware and software is evolving. Applications installed on the UE modify RAN and the wireless telecommunication network traffic. As such, network operators face challenges to efficiently reproduce production network traffic in a lab to be able to maintain quality control of the wireless telecommunication network.

BRIEF DESCRIPTION OF THE DRAWINGS

Detailed descriptions of implementations of the present invention will be described and explained through the use of the accompanying drawings.

Figure 1:
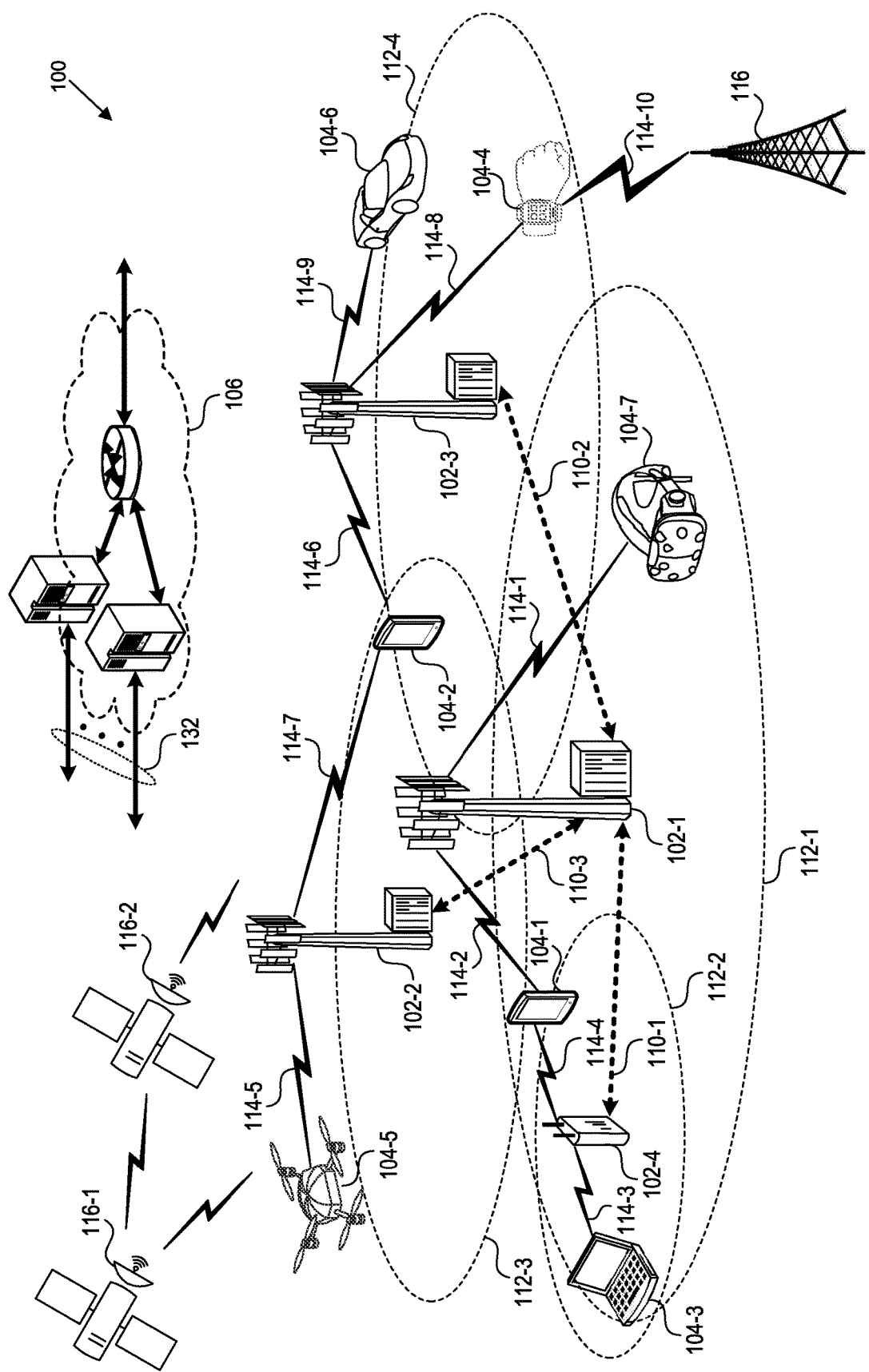
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed system and method generate a test case associated with a test RAN based on key performance indicators (KPIs) associated with a production RAN of the wireless telecommunication network. The test case mimics the production RAN and enables the wireless telecommunication network operators to detect network issues early in the development cycle, thus improving quality of network software and hardware. In addition, the test case can enable modeling of the network behavior prior to deploying the network in a different market or a different geographic area.

The system obtains the KPIs associated with the production RAN of the wireless telecommunication network. The KPIs can include low-level counters of nodes in the RAN, such as gNodeB. The system transforms the KPIs into relevant variables including a type of traffic associated with the production RAN, traffic characteristics associated with the production RAN, types of multiple mobile devices interacting with the production RAN, and a number of each type of the multiple mobile devices interacting with the production RAN. The system obtains capabilities of multiple mobile devices interacting with the test RAN.

The system creates the test case based on the relevant variables and the capabilities of multiple mobile devices interacting with the test RAN. To create a test case, the system adjusts a type of traffic associated with the test RAN, where the type of traffic includes data, voice, short message service (SMS), and a direction including upload and download. The system adjusts traffic characteristics including call duration and traffic load. The system adjusts the capabilities of the multiple mobile devices interacting with the test RAN to match the types of multiple mobile devices interacting with the production RAN and the number of each type of the multiple mobile devices interacting with the production RAN.

The system runs a simulation of the test case interacting with the test RAN to obtain simulation KPIs. The system can run the simulation for the amount of time needed to generate the KPIs, such as an hour or up to several days. The system determines whether the simulation KPIs correspond to the KPIs associated with the production RAN, such as determining whether the values are within 10% of each other. Upon determining that the simulation KPIs correspond to the KPIs associated with the production RAN, the system stores the test case in a database and periodically runs it. Upon determining that the simulation KPIs do not correspond to the KPIs associated with the production RAN, the system adjusts the test case and iteratively runs additional simulations, and makes additional adjustments, until the simulation KPIs correspond to the KPIs associated with the production RAN.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100, including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions, while the uplink transmissions can also be called reverse link transmissions. Each communication link 114 includes one or more carriers, where each carrier can be a signal composed of multiple subcarriers (e.g., waveform signals of different frequencies) modulated according to the various radio technologies. Each modulated signal can be sent on a different subcarrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits per second data transmission in the era of 6G and beyond, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and core architecture to achieve Control and User Plane Separation (CUPS) and achieve extremely low user plane latency. In yet another example of 6G, the network 100 can implement a converged Wi-Fi and core architecture to increase and improve indoor coverage.

5G Core Network Functions

Figure 2:
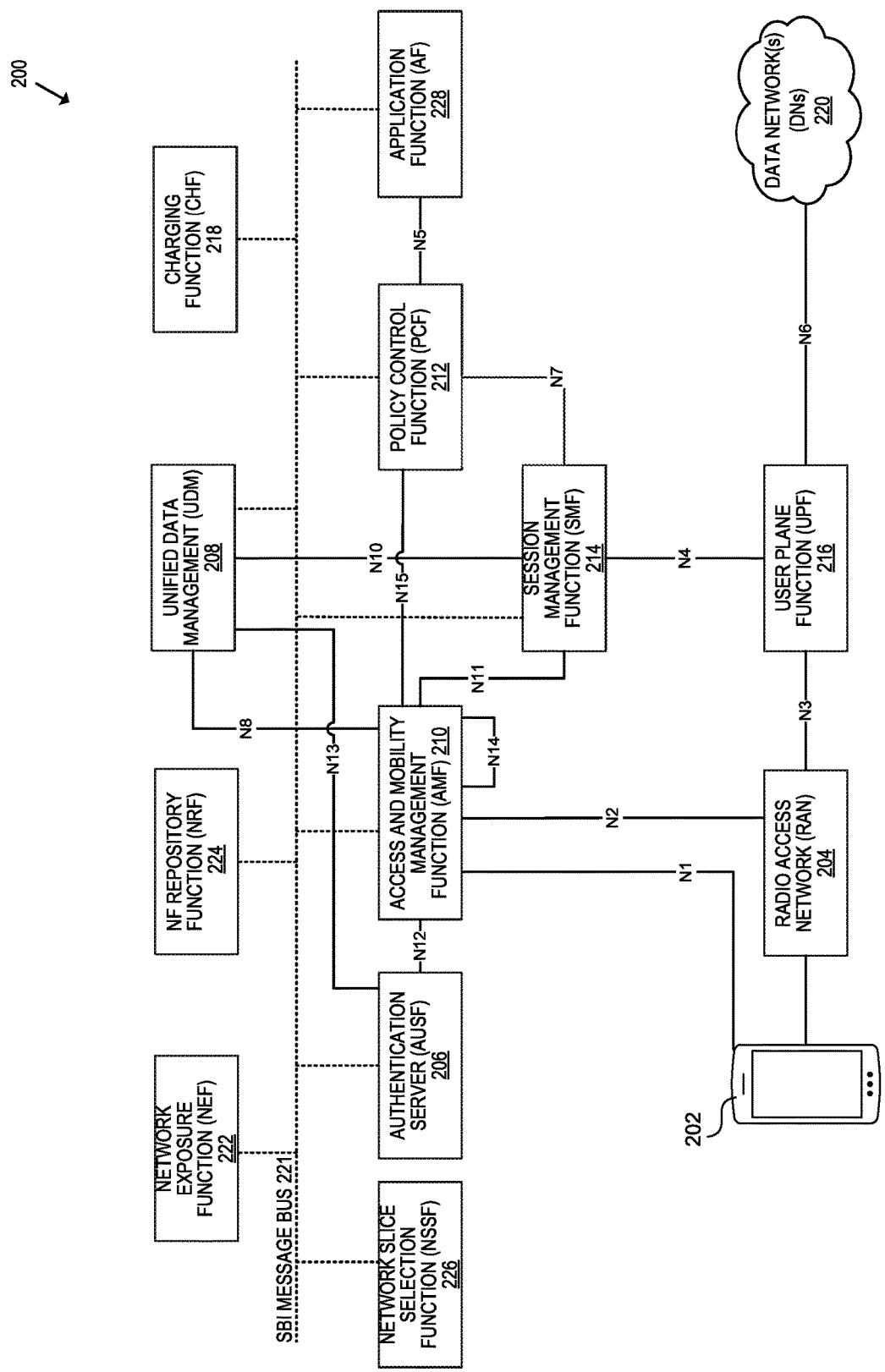
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226. The core elements AFs 228, NSSF 226, NRF 224, NEF 222, DN 220, CHF 218, UPF 216, SMF 214, PCF 212, AMF 210, UDM 208, and AUSF 206 contain information about wireless devices traffic pattern for instance UE location associated with gNB, traffic type, duration, and other user plane traffic characteristics such us protocols TCP/UDP, duration of traffic, etc.

Figure 3:
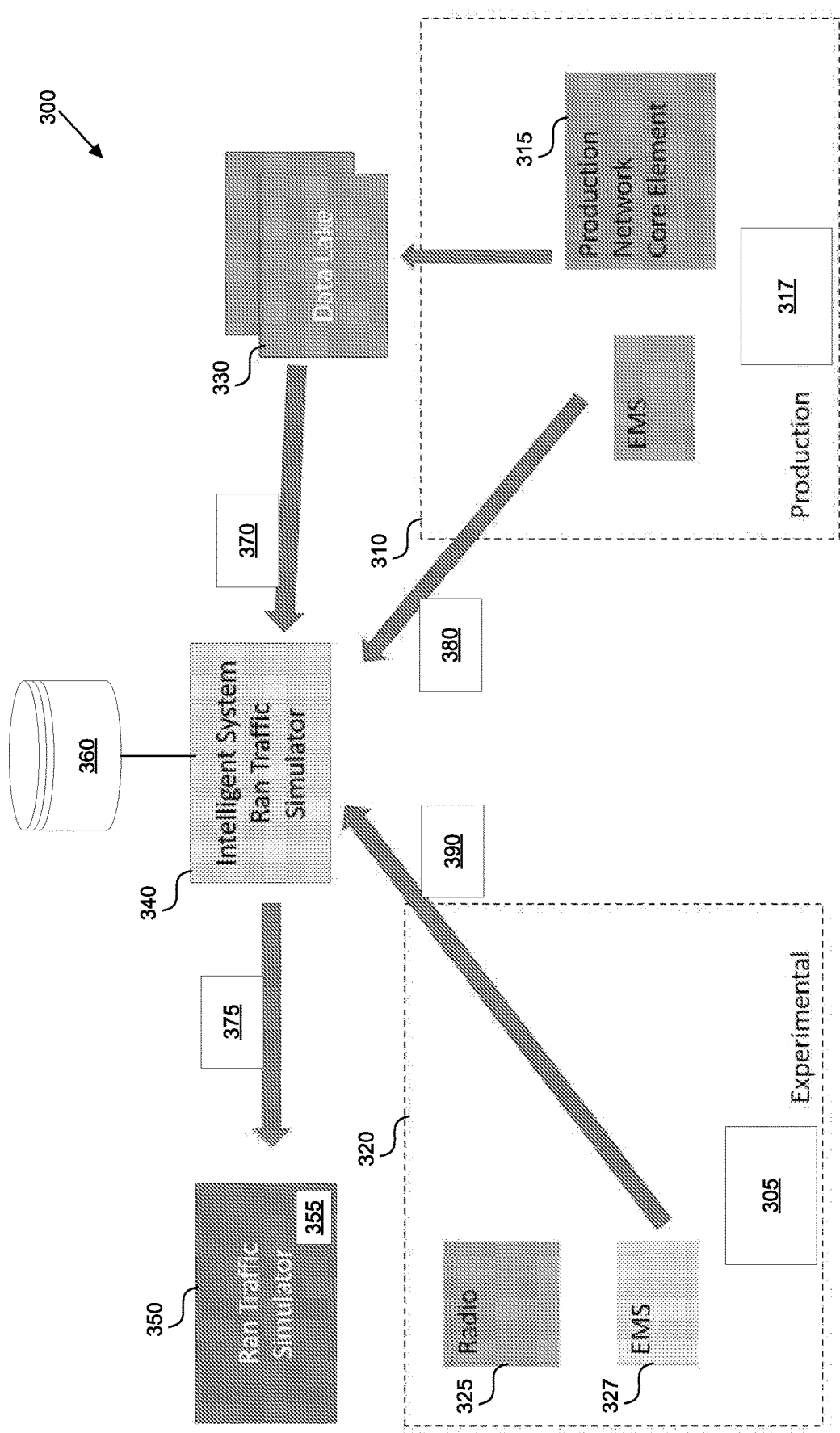
FIG. 3 shows a system to generate a test case associated with a test radio access network (RAN) of the network based on the key performance indicators (KPIs) associated with a production RAN of the network.

Generating a Test Case Associated with a Test Radio Access Network (RAN) Based on Key Performance Indicators (KPIs) Associated with a Production RAN of a Wireless Telecommunication Network FIG. 3 shows a system to generate a test case associated with a test RAN of the network 100 in FIG. 1 based on the KPIs associated with a production RAN of the network. The system 300 includes a production RAN 310, a test (or experimental) RAN 320, a data lake 330 from the Production Network Core Element 315, an intelligent system RAN traffic simulator 340, a RAN traffic simulator 350, and a database 360.

The production RAN 310 is the operational part of the network 100 and provides wireless connectivity to real UEs 317. For example, a gNB 315 can be in Times Square and service 500 users every hour. Of these 500 users, 100 of them can use data, 100 of them can perform handovers to other sites, 100 of them can use voice, and 200 users can connect to the gNB 315 and do nothing.

The test RAN 320 enables re-creating such production RAN 310 conditions in a lab to test potential updates, such as software updates, new NAN feature enablement to the production RAN, to predict the behavior of a production RAN in a different geography, etc.

To enable re-creation of the production RAN 310, the intelligent system RAN traffic simulator 340 can access the KPIs 370 from the element management system (EMS) from production network 100, 200 and user traffic characteristics from Core Elements 315 through data lake 330. User traffic characteristics can include upload and download bandwidth, type of traffic such as voice or data, the bandwidth needed per time of day, etc. The KPIs can be recorded by radios, and/or gNBs of the production RAN 310, and can be stored in the data lake 330. The KPIs can include traffic at the gNB, number of users, how long the gNB has been on air, call drop rate, call failure rate, tonnage (throughput at a gNB), generation of technology of UEs, manufacturer of UEs, type of traffic (such as data, voice, or SMS), direction of traffic (such as download or upload), call duration, type of UEs, a number of radio resource control (RRC) users connected, a number of voice over LTE (VoLTE) users, a number of voice over new radio (VoNR) users, etc.

The intelligent system RAN traffic simulator 340 can transform the KPIs 370, 380 into relevant variables 375 and provide the relevant variables to the RAN traffic simulator 350. In the Times Square example, the intelligent system RAN traffic simulator 340 can indicate to the RAN traffic simulator to instantiate 100 traffic users, 100 voice users, and 100 mobility users and run a simulation on the radio 325, e.g., gNB, associated with the test RAN 320 to generate simulation KPIs 390.

The element management system (EMS) 327 can monitor simulation KPIs 390 at a particular interval, such as 15 or 20 minutes. The EMS 327 can pass the simulation KPIs 390 to the intelligent system RAN traffic simulator 340. The intelligent system RAN traffic simulator 340 can compare the simulation KPIs 390 to the production KPIs 370, 380. If the two KPIs are not sufficiently similar, such as within 10% of each other, the intelligent system RAN traffic simulator 340 can iteratively adjust the relevant variables 375 used in the simulation, and run another simulation until the simulation KPIs 390 and the production KPIs 370, 380 are sufficiently similar.

In one embodiment, the intelligent system RAN traffic simulator 340 can obtain radio 325 configurations as well as capabilities of the multiple UEs 305 interacting with the test RAN 320. The multiple UEs 305 can be physical UEs or can be UE simulators. To obtain the capabilities of the multiple UEs 305 and the radio 325, the intelligent system RAN traffic simulator 340 can obtain layer 3 messages indicating band, bandwidth, physical cell identifier (PCI), single-sideband modulation (SSB), and System Information Blocks (SIBs).

The intelligent system RAN traffic simulator 340 can collect relevant KPIs 370, 380 from the production RAN 310 and the data lake 330. The KPIs 370, 380 can include user plane KPIs from core network 100. The intelligent system RAN traffic simulator 340 can transform these KPIs into relevant variables 375 such as a type of traffic associated with the production RAN, traffic characteristics associated with the production RAN, types of multiple UEs interacting with the production RAN, a number of each type of the multiple UEs interacting with the production RAN, etc.

The database 360 can include capabilities of the multiple UEs 305 interacting with the test RAN 320. The database 360 can include different types of multiple UEs 305, chipset types and their features, etc.

The intelligent system RAN traffic simulator 340 can use the input KPIs 370, 380 to create relevant variables 375 and consequently a first iteration of a test case 355 for the RAN traffic simulator 350. The relevant variables 375 can include type of traffic, such as data, voice, short message service (SMS), and direction of traffic such as upload or download. In addition, the relevant variables 375 can include traffic characteristics such as call duration and/or traffic load. Further, the relevant variables 375 can include UE type distribution such as how many and which types of UEs to include in the simulations.

The RAN traffic simulator 350 can run a simulation of the test case 355 for a period corresponding to the KPI generation cycle, such as 15 minutes or one hour, to generate the simulation KPIs 390.

The intelligent system RAN traffic simulator 340 can read the simulation KPIs 390 generated by the first test case 355, and can compare the simulation KPIs 390 with the production KPIs 370, 380 to identify a difference. The intelligent system RAN traffic simulator 340 can use this difference to fine-tune a second iteration of the test case, until the simulation KPIs 390 correspond to the production KPIs 370, 380 to within a predetermined threshold, such as 10%. In the second iteration, the number of users can be added or subtracted, the type of UEs can be changed, etc., until the simulation KPIs 390 correspond to the production KPIs 370, 380.

Upon creating a matching KPI test case, the intelligent system RAN traffic simulator 340 can store the final test case 355 as a baseline case and can periodically run the final test case 355. In addition, the system 300 can periodically check the baseline case against the production KPIs 370, 380. If there is a change between the baseline model and the production KPIs 370, 380, the system 300 can try to adjust the baseline test case to match the production KPIs 370, 380.

The intelligent system RAN traffic simulator 340 can query the software version of the production RAN 310 nodes and store the software version in the database 360 along with the KPIs 370, 380, or 390. The system 300 can periodically check, such as every hour or every day, the software version of the production RAN 310. When the system 300 detects a software change, the intelligent system RAN traffic simulator 340 can trigger a fresh simulation of the baseline case. The intelligent system RAN traffic simulator 340 can compare the newly generated simulation KPIs with the previous KPIs 370, 380, or 390, and determine whether there is a significant difference between the KPIs. If there is a significant difference, the system 300 can highlight the difference. In addition, the system 300 can determine whether to enable the software change on the network 100, 200 based on the impact of the change on the KPIs. For example, if there is a significant detrimental change to the KPIs, the system 300 can choose to not deploy the software change to the production RAN 310.

Figure 4:
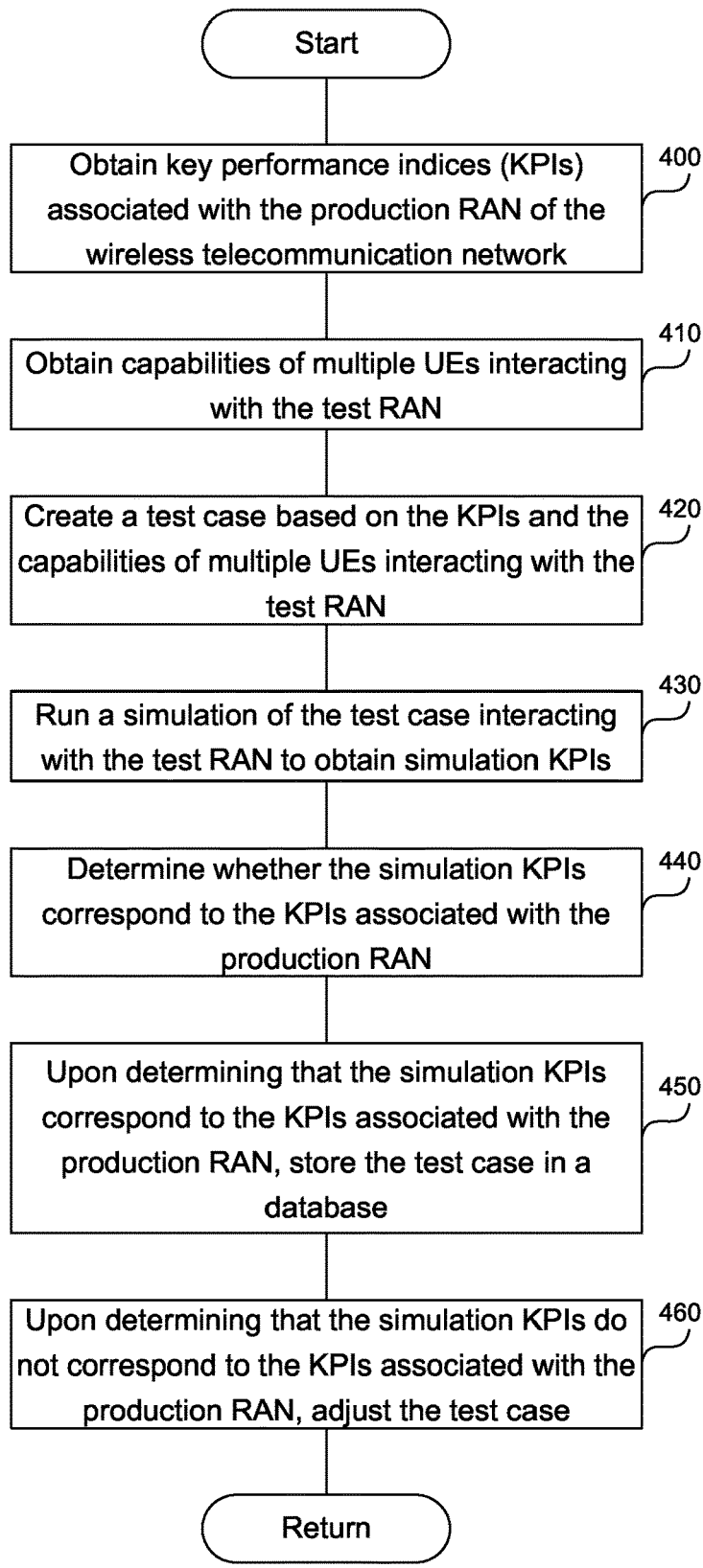
FIG. 4 is a flowchart of a method to generate a test case associated with a test RAN of the network based on KPIs associated with a production RAN of the network.

FIG. 4 is a flowchart of a method to generate a test case associated with a test RAN of the network 100 in FIG. 1 based on KPIs associated with a production RAN of the network. In step 400, a hardware or software processor executing instructions described in this application can obtain KPIs associated with the production RAN of the wireless telecommunication network. The processor can transform the KPIs into relevant variables. The KPIs can include number of data traffic connection attempts/success (mobile originated/terminated), handover attempts/success, voice calls attempts/success (mobile originated/terminated), UE bin distribution, Call Failure Rate, Call Drop Rate, DL traffic Tonnage DL, UL Traffic tonnage, Voice Call Duration, etc. The relevant variables include a type of traffic associated with the production RAN, traffic characteristics associated with the production RAN, types of multiple UEs interacting with the production RAN, and a number of each type of the multiple UEs interacting with the production RAN, where the types of the multiple UEs interacting with the production RAN and the number of each type of the multiple UEs interacting with the production RAN include a number of radio resource control (RRC) users connected, a number of voice over LTE (VoLTE) users, a number of voice over new radio (VoNR) users, and a tonnage.

In step 410, the processor can obtain capabilities of multiple UEs interacting with the test RAN via layer 3 messages indicating band, bandwidth, physical cell identifier (PCI), single-sideband modulation (SSB), and System Information Blocks (SIBs). Further, the processor can obtain a chipset type associated with the multiple UEs interacting with the test RAN, and a feature associated with the chipset type.

In step 420, the processor can create the test case based on the KPIs and the capabilities of multiple UEs interacting with the test RAN. In the test case, the processor can adjust a type of traffic associated with the test RAN, where the type of traffic includes data, voice, short message service (SMS), and a direction including upload and download. The processor can adjust traffic characteristics including call duration and traffic load. The processor can adjust the capabilities of the multiple UEs interacting with the test RAN to match the types of multiple UEs interacting with the production RAN and the number of each type of the multiple UEs interacting with the production RAN.

In step 430, the processor can run a simulation of the test case interacting with the test RAN to obtain simulation KPIs. The processor can run the simulation for an hour or for multiple days.

In step 440, the processor can determine whether the simulation KPIs correspond to the KPIs of the production RAN, such as whether the KPIs are within 10% of each other.

In step 450, upon determining that the simulation KPIs correspond to the KPIs of the production RAN, the processor can store the test case in a database. The processor can periodically run the test case to determine whether the simulation KPIs of the test case match the production KPIs.

In step 460, upon determining that the simulation KPIs do not correspond to the KPIs of the production RAN, the processor can adjust the test case and run a second simulation of the test case until the subsequent KPIs correspond to the KPIs of the production RAN.

The processor can obtain a software version associated with the production RAN. The processor can store the software version associated with the production RAN and the simulation KPIs. The processor can detect a change in the software version associated with the production or experimental RAN by checking the software version periodically, such as every day or every hour. The processor can run a second simulation of the test case interacting with the test RAN to obtain second simulation KPIs. The processor can determine whether a significant difference exists between the simulation KPIs and the second simulation KPIs. Upon determining that the significant difference exists, the processor can create a notification of the significant difference.

Computer System

Figure 5:
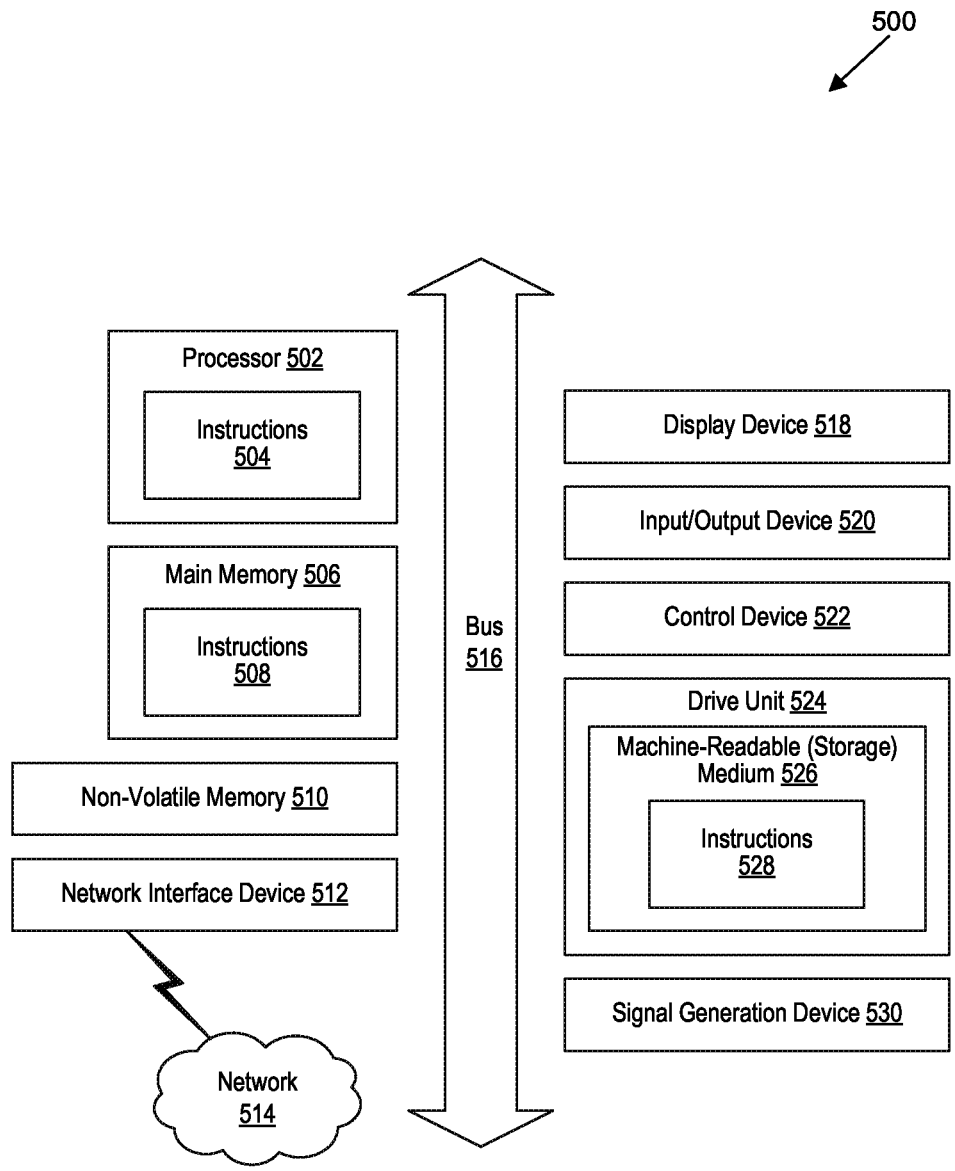
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computer system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 500. In some implementations, the computer system 500 can be an embedded computer system, a system-on-chip (SOC), a single-board computer system (SBC), or a distributed system, such as a mesh of computer systems, or can include one or more cloud components in one or more networks. Where appropriate, one or more computer systems 500 can perform operations in real time, in near real time, or in batch mode.

The network interface device 512 enables the computer system 500 to mediate data in a network 514 with an entity that is external to the computer system 500 through any communication protocol supported by the computer system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computer system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computer system 500 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. At least one non-transitory computer-readable storage medium storing instructions to generate a test case associated with a test radio access network (RAN) of a wireless telecommunication network based on key performance indicators (KPIs) associated with a production RAN of the wireless telecommunication network, which, when executed by at least one data processor of a system, cause the system to:
    obtain the KPIs associated with the production RAN of the wireless telecommunication network;
    transform the KPIs into relevant variables including a type of traffic associated with the production RAN, traffic characteristics associated with the production RAN, types of multiple mobile devices interacting with the production RAN, user traffic characteristics, and a number of each type of the multiple mobile devices interacting with the production RAN;
    obtain capabilities of multiple mobile devices interacting with the test RAN;
    create the test case based on the relevant variables and the capabilities of the multiple mobile devices interacting with the test RAN by:
        adjusting a type of traffic associated with the test RAN, wherein the type of traffic includes data, voice, short message service (SMS), and a direction including upload and download;
        adjusting traffic characteristics including call duration and traffic load; and
        adjusting the capabilities of the multiple mobile devices interacting with the test RAN to match the types of the multiple mobile devices interacting with the production RAN and the number of each type of the multiple mobile devices interacting with the production RAN;
    run a simulation of the test case interacting with the test RAN to obtain simulation KPIs;
    determine whether the simulation KPIs correspond to the KPIs associated with the production RAN;
    upon determining that the simulation KPIs correspond to the KPIs associated with the production RAN, store the test case in a database; and
    upon determining that the simulation KPIs do not correspond to the KPIs associated with the production RAN, adjust the test case.

2. The at least one non-transitory computer-readable storage medium of claim 1, comprising instructions to:
    obtain a software version associated with the production RAN, and a software version associated with an experimental RAN;
    store the software version associated with the production RAN, the software version associated with the experimental RAN, and the simulation KPIs;
    detect a change in the software version associated with the production RAN or a change in the software version associated with the experimental RAN;
    run a second simulation of the test case interacting with the test RAN to obtain second simulation KPIs;
    determine whether a significant difference exists between the simulation KPIs and the second simulation KPIs; and
    upon determining that the significant difference exists, create a notification of the significant difference.

3. The at least one non-transitory computer-readable storage medium of claim 1, comprising instructions to:
    obtain a software version associated with the production RAN and a software version associated with an experimental RAN; and
    store the software version associated with the production RAN, the software version associated with the experimental RAN, and relevant KPIs including the KPIs associated with the production RAN or the simulation KPIs.

4. The at least one non-transitory computer-readable storage medium of claim 1, wherein the types of multiple mobile devices interacting with the production RAN and the number of each type of the multiple mobile devices interacting with the production RAN include a number of radio resource control (RRC) users connected, a number of voice over LTE (VoLTE) users, a number of voice over new radio (VoNR) users, and a tonnage.

5. The at least one non-transitory computer-readable storage medium of claim 1, wherein the multiple mobile devices interacting with the test RAN include a physical mobile device or a mobile device simulator.

6. The at least one non-transitory computer-readable storage medium of claim 1, wherein the instructions to obtain capabilities of multiple mobile devices interacting with the test RAN comprise instructions to:
    obtain layer 3 messages indicating band, bandwidth, physical cell identifier (PCI), single-sideband modulation (SSB), and System Information Blocks (SIBs); and
    obtain a chipset type associated with the multiple mobile devices interacting with the test RAN and a feature associated with the chipset type.

7. The at least one non-transitory computer-readable storage medium of claim 1, comprising instructions to:
    upon determining that the simulation KPIs do not correspond to the KPIs associated with the production RAN, run a subsequent simulation to obtain subsequent KPIs and adjust the test case until the subsequent KPIs correspond to the KPIs associated with the production RAN.

8. A system comprising:
at least one hardware processor; and
at least one non-transitory memory storing instructions, which, when executed by the at least one hardware processor, cause the system to:
   obtain key performance indicators (KPIs) associated with a production radio access network (RAN) of a wireless telecommunication network, and traffic characteristics associated with multiple user equipment (UEs);
   obtain capabilities of the multiple UEs interacting with a test RAN;
   create a test case based on the KPIs and the capabilities of the multiple UEs interacting with the test RAN by:
      adjusting a type of traffic associated with the test RAN,
         wherein the type of traffic includes data, voice, short message service (SMS), and a direction including upload and download;
      adjusting traffic characteristics including call duration and traffic load; and
      adjusting the capabilities of the multiple UEs interacting with the test RAN to match types of multiple UEs interacting with the production RAN and a number of each type of the multiple UEs interacting with the production RAN;
   run a simulation of the test case interacting with the test RAN to obtain simulation KPIs;
   determine whether the simulation KPIs correspond to the KPIs associated with the production RAN;
   upon determining that the simulation KPIs correspond to the KPIs associated with the production RAN, store the test case in a database; and
   upon determining that the simulation KPIs do not correspond to the KPIs associated with the production RAN, adjust the test case.

9. The system of claim 8, comprising instructions to:
obtain a software version associated with the production RAN and a software version associated with an experimental RAN;
store the software version associated with the production RAN, the software version associated with the experimental RAN and the simulation KPIs;
detect a change in the software version associated with the production RAN or a change in the software version associated with the experimental RAN;
run a second simulation of the test case interacting with the test RAN to obtain second simulation KPIs;
determine whether a significant difference exists between the simulation KPIs and the second simulation KPIs; and
upon determining that the significant difference exists, create a notification of the significant difference.

10. The system of claim 8, comprising instructions to:
obtain a software version associated with the production RAN and a software version associated with an experimental RAN; and
store the software version associated with the production RAN, the software version associated with the experimental RAN and relevant KPIs including the KPIs associated with the production RAN or the simulation KPIs.

11. The system of claim 8, wherein the KPIs associated with the production RAN indicate a type of traffic associated with the production RAN, traffic characteristics associated with the production RAN, a number of radio resource control (RRC) users connected, a number of voice over LTE (VoLTE) users, a number of voice over new radio (VoNR) users, and a tonnage.

12. The system of claim 8, wherein the multiple UEs interacting with the test RAN include a physical UE or a UE simulator.

13. The system of claim 8, wherein the instructions to obtain capabilities of multiple UEs interacting with the test RAN comprise instructions to:
obtain layer 3 messages indicating band, bandwidth, physical cell identifier (PCI), single-sideband modulation (SSB), and System Information Blocks (SIBs); and
obtain a chipset type associated with the multiple UEs interacting with the test RAN and a feature associated with the chipset type.

14. The system of claim 8, comprising instructions to:
upon determining that the simulation KPIs do not correspond to the KPIs associated with the production RAN, run a subsequent simulation to obtain subsequent KPIs and adjust the test case until the subsequent KPIs correspond to the KPIs associated with the production RAN.

15. A method comprising:
obtaining key performance indicators (KPIs) associated with a production radio access network (RAN) of a wireless telecommunication network;
obtaining capabilities of multiple user equipment (UEs) interacting with a test RAN;
creating a test case based on the KPIs and the capabilities of the multiple UEs interacting with the test RAN by:
   adjusting a type of traffic associated with the test RAN,
      wherein the type of traffic includes data, voice, short message service (SMS), and a direction including upload and download;
   adjusting traffic characteristics including call duration and traffic load; and
   adjusting the capabilities of the multiple UEs interacting with the test RAN to match types of multiple UEs interacting with the production RAN and a number of each type of the multiple UEs interacting with the production RAN;
running a simulation of the test case interacting with the test RAN to obtain simulation KPIs;
determining whether the simulation KPIs correspond to the KPIs associated with the production RAN;
upon determining that the simulation KPIs correspond to the KPIs associated with the production RAN, storing the test case in a database; and
upon determining that the simulation KPIs do not correspond to the KPIs associated with the production RAN, adjusting the test case.

16. The method of claim 15, comprising:
obtaining a software version associated with the production RAN and a software version associated with an experimental RAN;
storing the software version associated with the production RAN, the software version associated with the experimental RAN and the simulation KPIs;
detecting a change in the software version associated with the production RAN or a change in the software version associated with the experimental RAN;
running a second simulation of the test case interacting with the test RAN to obtain second simulation KPIs;
determining whether a significant difference exists between the simulation KPIs and the second simulation KPIs; and upon determining that the significant difference exists, creating a notification of the significant difference.

17. The method of claim 15, comprising:

obtaining a software version associated with the production RAN and a software version associated with an experimental RAN; and storing the software version associated with the production RAN, the software version associated with the experimental RAN and relevant KPIs including the KPIs associated with the production RAN or the simulation KPIs.

18. The method of claim 15, wherein the KPIs associated with the production RAN indicate a type of traffic associated with the production RAN, traffic characteristics associated with the production RAN, types of multiple UEs interacting with the production RAN, a number of radio resource control (RRC) users connected, a number of voice over LTE (VoLTE) users, a number of voice over new radio (VoNR) users, and a tonnage.

19. The method of claim 15, wherein obtaining the capabilities of the multiple UEs interacting with the test RAN comprises:

obtaining layer 3 messages indicating band, bandwidth, physical cell identifier (PCI), single-sideband modulation (SSB), and System Information Blocks (SIBs); and obtaining a chipset type associated with the multiple UEs interacting with the test RAN and a feature associated with the chipset type.

20. The method of claim 15, comprising:

upon determining that the simulation KPIs do not correspond to the KPIs associated with the production RAN, running a subsequent simulation to obtain subsequent KPIs and adjusting the test case until the subsequent KPIs correspond to the KPIs associated with the production RAN.

* * * * *